United States Patent
Blázquez Sánchez

(10) Patent No.: US 12,059,745 B2
(45) Date of Patent: Aug. 13, 2024

(54) DEVICE FOR SETTING A FOCUS POSITION OF A LASER BEAM IN A LASER MACHINING SYSTEM, LASER MACHINING SYSTEM COMPRISING THE SAME, AND METHOD FOR SETTING A FOCUS POSITION OF A LASER BEAM IN A LASER MACHINING SYSTEM

(71) Applicant: PRECITEC GMBH & CO. KG, Gaggenau (DE)

(72) Inventor: David Blázquez Sánchez, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 695 days.

(21) Appl. No.: 17/282,434

(22) PCT Filed: Sep. 18, 2019

(86) PCT No.: PCT/EP2019/074965
§ 371 (c)(1),
(2) Date: Apr. 2, 2021

(87) PCT Pub. No.: WO2020/069866
PCT Pub. Date: Apr. 9, 2020

(65) Prior Publication Data
US 2021/0387281 A1    Dec. 16, 2021

(30) Foreign Application Priority Data
Oct. 5, 2018  (DE) ........................ 10 218 124 627.7

(51) Int. Cl.
*B23K 26/04*   (2014.01)
*B23K 26/046*  (2014.01)
*B23K 26/70*   (2014.01)
*G02B 7/28*    (2021.01)
*G02B 19/00*   (2006.01)

(52) U.S. Cl.
CPC .......... *B23K 26/046* (2013.01); *B23K 26/705* (2015.10); *B23K 26/707* (2015.10);
(Continued)

(58) Field of Classification Search
None
See application file for complete search history.

(56) References Cited

U.S. PATENT DOCUMENTS 6,392,192 B1   5/2002   Cole, III et al.
6,462,301 B1   10/2002  Scott et al.
(Continued)

FOREIGN PATENT DOCUMENTS

DE   10045191 A1    5/2001
JP   H02 75489 A    3/1990
(Continued)

OTHER PUBLICATIONS

Machine translation of Japan Patent document No. 2012187591A (Year: 2023).*
(Continued)

*Primary Examiner* — Geoffrey S Evans
(74) *Attorney, Agent, or Firm* — DINSMORE & SHOHL LLP

(57) ABSTRACT

A device is provided for setting a focus position (z) of a laser beam in a laser machining system. The device comprises a computing unit configured to calculate a time-dependent value $z_t$ of the focus position (z), wherein the computing unit calculates the time-dependent value $z_t$ of the focus position (z) based on a first parameter and a second parameter, wherein the first parameter indicates a magnitude A of a laser-power dependent focus shift per power unit and the second parameter indicates a time constant $\tau$ of a change in focus position due to a thermal lens by a factor of 1/e, and a control unit configured to use a mechanism for setting the
(Continued)

focus position (z) to set the focus position (z) of the laser beam based on the time-dependent value $z_t$ of the focus position (z).

15 Claims, 3 Drawing Sheets

(52) U.S. Cl.
CPC .......... *G02B 7/28* (2013.01); *G02B 19/0009* (2013.01); *G02B 19/0047* (2013.01)

(56) References Cited

U.S. PATENT DOCUMENTS

| | | |
|---|---|---|
| 2014/0347655 A1 | 11/2014 | Jurca |
| 2016/0263704 A1 | 9/2016 | Schwarze et al. |

FOREIGN PATENT DOCUMENTS

| | | | |
|---|---|---|---|
| JP | 2012187591 A | * | 10/2012 |
| JP | 2013248656 A | * | 12/2013 |
| JP | 2016191144 A | | 11/2016 |
| WO | 2009/122758 A1 | | 10/2009 |
| WO | 2011009594 A1 | | 1/2011 |

OTHER PUBLICATIONS

Machine translation of Japan Patent document No. 2013248656A (Year: 2023).*
International Search Report and Written opinion dated Mar. 26, 2020 pertaining to PCT Application No. PCT/EP2019/074965 filed Sep. 18, 2019.

* cited by examiner

DEVICE FOR SETTING A FOCUS POSITION OF A LASER BEAM IN A LASER MACHINING SYSTEM, LASER MACHINING SYSTEM COMPRISING THE SAME, AND METHOD FOR SETTING A FOCUS POSITION OF A LASER BEAM IN A LASER MACHINING SYSTEM

CROSS-REFERENCE TO RELATED APPLICATIONS

This application claims priority to German Patent Application No. 10 2018 124627.7, filed Oct. 5, 2018.

TECHNICAL FIELD

The present disclosure relates to a device for setting a focus position of a laser beam in a laser machining system or a laser machining head, such as a cutting or welding head, a laser machining system comprising such a device and a method for setting a focus position of a laser beam in a laser machining system. In particular, the present disclosure relates to the determination and correction of a focus position of a machining laser beam in real time.

BACKGROUND ART

In a device for machining material using laser, e.g. in a laser machining head, for example for laser welding or laser cutting, the laser beam exiting from a laser light source or an end of a laser fiber is focused or collimated onto the workpiece to be machined by means of a beam guiding and focusing optics. Conventionally, a laser machining head is used with a collimator optics and a focusing optics, wherein the laser light is supplied via an optical fiber.

A problem in laser material machining is the so-called "thermal lens" due to the heating of optical elements for laser beam guiding and focusing by laser power, in particular in the multi-kilowatt range, and the temperature dependence of the refractive index of optical glasses. In particular, inhomogeneous heating results in a thermal gradient in the optics, creating the so-called "thermal lens" effect. For example, a protective glass becomes refractive due to the generated thermal gradient when laser radiation with multi-kW laser power passes through, i.e. becomes a thermal lens. In comparison, a homogeneously heated protective glass does not become refractive. In laser material machining, the thermal lens results in a focus shift along the beam propagation direction, which may have a negative effect on the quality of machining.

During the laser material machining process, primarily two mechanisms lead heating of the optical elements. On the one hand an increase in laser power and on the other hand soiling of the optical elements. Furthermore, it is possible for the optical elements to undergo mechanical deformation, leading to a change in the refractive index. For example, the mechanical deformation may be caused by a thermal expansion of the socket of the optical elements.

In order to ensure high-quality laser machining, it is necessary to detect the respective focus position and to compensate the focus shift, i.e., to provide a fast and accurate focus position control.

However, a thermal lens not only leads to a focus shift, but also to a deterioration in beam quality and may, for example, cause aberrations. This results in a change in the overall beam caustics, e.g. of a focus diameter. The determination of the focus position by a simple comparison with reference values is therefore imprecise and does not represent a control of the focus position in real time.

DISCLOSURE OF THE INVENTION

It is an object of the present disclosure to provide a device for setting a focus position of a laser beam in a laser machining system, a laser machining system comprising such a device, and a method for setting a focus position of a laser beam in a laser machining system that can reliably determine one or more settings for a desired or predetermined focus position without complex mechanical means. In particular, it is an object of the present disclosure to determine and set one or more settings for a desired or predetermined focus position of a laser beam in real time during a laser machining process.

This object is achieved by the subject matter disclosed herein. Advantageous embodiments of the invention are also disclosed.

According to embodiments of the present disclosure, a device for setting a predetermined focus position Z of a laser beam in a laser machining system is provided. The device comprises a computing unit configured to calculate a time-dependent value $z_t$ of the focus position, the computing unit calculating the time-dependent value $z_t$ of the focus position based on a first parameter, a second parameter, and a third parameter. The first parameter comprises a laser-power dependent focus shift A, e.g. a magnitude of a laser-power dependent focus shift per power unit or power step, e.g. in millimeters per kilowatt. For example, with an imaging scale of 1 and a change in the laser power ΔP of 1 kW, the laser-power dependent focus shift A is the focus shift in the stationary state, i.e., t→∞. The second parameter comprises a time constant τ of a change in the focus position due to a thermal lens, i.e. due to a temperature-induced change in refractive power, of at least one optical element of a laser beam optics. For example, the time constant τ describes the period of time until the focus position changes by the factor 1/e or decreases by the factor 1/e. The time constant τ may therefore also be considered to be the time constant of a temperature-induced focus shift. The third parameter comprises a current laser power P. The computing unit may also be configured, in order to set the predefined focus position Z, to calculate a setting for a setting unit for setting the focus position. The setting may include a position of at least one movable optical element of the laser beam optics configured to set the focus position, for example a lens position. The device also comprises a control unit configured to use the setting unit for setting the focus position to set the predetermined focus position of the laser beam based on the calculated setting or on the time-dependent value $z_t$ of the focus position. Here, the laser beam optics may be referred to as the entirety of the optical elements in the beam path of the laser beam in the laser machining system. Preferred optional embodiments and special aspects of the disclosure are apparent from the dependent claims, the drawings and the present description.

According to the invention, using three parameters, namely the laser-power dependent focus shift A, the time constant r, and a current laser power P, the position of the focus, for example with respect to the workpiece, is calculated. Based thereon, the focus position can be set such that the actual focus position corresponds, for example, to a desired focus position. Thus, a focus setting in real time can be made possible in a structurally compact and modular manner. In particular, a time-dependent correction term taking into account the dynamic development of the temperature-induced focus shift is used for setting the focus position. For example, the focus setting can be performed in real time based on a preset control curve supplemented with the time-dependent correction term. The time-dependent correction term does not require a complex mechanical structure, thereby making a reduction of the complexity of the device both in terms of manufacture and in terms of operation possible. In addition, the solution according to the invention allows flexible responses to the focus shift or fluctuations in the focus. For example, one or more factors can be taken into account, such as scattering due to the absorption of optical materials, different thermal conditions (e.g. water cooling, flow rate, and temperature) or soiling of the laser beam optics. By means of the correct choice of the parameters of the laser-power dependent focus shift A and the time constant $\tau$, all of these influences can be corrected to such an extent that the process quality is ensured. The parameters may be set by a user of the laser machining system.

Preferably, the computing unit and the control unit are implemented in a common software and/or hardware module, such as, for example, a computing and control unit. The computing and control unit may also be referred to as an "evaluation unit". According to some embodiments, the computing and control unit may comprise a storage medium in which data used to calculate the focus position is stored.

The laser machining system preferably comprises a laser beam optics that may include one or more optical elements, such as a lens or a lens system. In particular, the laser beam optics may include at least one optical element with temperature-dependent refractive power and/or a movable optical element configured to set the focus position. The thermal lens or the temperature-induced change in refractive power may occur in at least one optical element of the laser beam optics. Here, the optical element of the laser optics that has a temperature-dependent refractive power, i.e. is subject to the effect of the thermal lens, may be or comprise a movable optical element configured to set the focus position. The at least one optical element with the temperature-dependent refractive power and the at least one movable optical element for setting the focus position may be or comprise the same or different elements. The laser optics may comprise, for example, collimator optics, focusing optics, zoom optics, beam shaping optics and/or protective glass. Here, an optics may refer to a lens or a lens group with a defined focal length or a lens group with a variable focal length (e.g., a lens group with several movable lenses in a zoom optics). The one or more optical elements may be made of quartz glass. However, the present disclosure is not limited thereto, and the one or more optical elements may be made of other materials, such as $CaF_2$ or sapphire.

The computing unit is preferably further configured to calculate the time-dependent value of the focus position based on a further parameter indicating a magnification m of the laser beam optics. Here, the magnification m may also be referred to as the magnification of the laser machining system. In some embodiments, the laser power-dependent focus shift A and the time constant $\tau$ may be preset, but can be set or changed for a user of the laser machining system. The parameter magnification m, on the other hand, that is used for setting the focus position, is preferably known and cannot be changed or set by the user.

In some embodiments, the computing unit is configured to calculate the time-dependent value $z_t$ of the focus position using the following equation:

$$z_t(\Delta P, t) = A \cdot m^2 \cdot \Delta P \cdot (1 - e^{-t/\tau})$$

where $\Delta P = P - P_0$, and where P indicates the current laser power at time t and $P_0$ indicates a reference laser power. The time t=0 is defined as the time at which a change in the reference power takes place, i.e. when $\Delta P \neq 0$. If the laser power changes by $\Delta P$, the thermal lens or the temperature-induced change in refractive power may change according to the time constant r. This change leads to a change in the focus position, which can be described with the help of the correction term $z_t(\Delta P, t)$. The correction term $z_t(\Delta P, t)$ takes said dynamics of the thermal lens into account, allowing for the actual focus position to be determined and set more precisely. In particular, the control unit may set the predetermined focus position Z in such a way that the dynamic effects of the thermal lens described by the correction term $z_t(\Delta P, t)$ are compensated. As a result, machining quality can be improved.

In one embodiment, the laser-power dependent focus shift A can be in a range of 0.002-0.2 mm/kW, or in particular 0.04 mm/kW. In one embodiment, the time constant $\tau$ can be in a range from 0.1-1000 s, or in particular 30 s.

Preferably, the computing unit is further configured to use a stationary value $z_0$ of the focus position, the control unit being configured to set the focus position of the laser beam based on the time-dependent value $z_t$ and the stationary value $z_0$. The stationary value $z_0$ of the focus position for a reference power $P_0$ at a certain lens position $L_1$ may be calculated, for example, using ray tracing software. One or more stationary values are preferably stored as a control curve for a given reference power $P_0$. In other words, a setting for the setting unit corresponding to the stationary value $z_0$ of the focus position, i.e. for example a lens position $L_1(z_0(P_0))$ for the stationary focus position $z_0$, may be stored in the computing unit or control unit.

The stationary value $z_0$ may be independent of time and may in particular indicate the focus position without the thermal lens for the reference laser power $P_0$. The stationary value $z_0$ may indicate the focus position (z) without taking into account a dynamic behavior of the thermal lens for the reference laser power $P_0$. In other words, the stationary value $z_0$ may indicate the focus position (z) without the thermal lens for the reference laser power $P_0 = 0$ kW. The focus position may comprise or be a sum of the stationary value $z_0$ and the time-dependent value $z_t$.

The stationary value $z_0$ can further indicate the focus position with a thermal lens without taking into account a dynamic behavior for the reference laser power $P_0$. In this case, the stationary value $z_0$ is based on a change in a refractive index n, for example of the optical element causing the thermal lens, as a function of a reference laser power $P_0$ incident on the optical element.

Preferably, the control unit is configured to set the focus position of the laser beam further based on an offset $z_{0ff}$ of the focus position. The offset $z_{0ff}$ may be independent of the time and the laser power. The offset $z_{0ff}$ may be defined for a magnification m, a plurality of magnifications m being possible, e.g. in a zoom system. In particular, the offset $z_{0ff}$ may compensate for tolerances, such as mechanical tolerances. The offset $z_{0ff}$ may be used for fine adjustment for a more precise determination of the focus position. The focus position may comprise or be a sum of the stationary value $z_0$, the time-dependent value $z_t$ and the offset $z_{0ff}$.

Preferably, the device comprises a user interface configured to receive user input at least for the laser-power dependent focus shift A and the time constant $\tau$ of the thermal lens. Optionally, the user interface may be configured to receive user input for the at least one offset $z_{0ff}$. The user interface may allow the user to vary these parameters.

Effects caused by component replacement, aging, or soiling of optics can be compensated for.

According to a further aspect of the present disclosure, a laser machining system is provided. The laser machining system comprises a laser device for providing a laser beam, a laser beam optics in the beam path of the laser beam, the laser beam optics including at least one optical element with temperature-dependent refractive power, and the device for setting a focus position of a laser beam according to the embodiments of the present disclosure. The laser machining system may be a laser cutting head or a laser welding head.

According to yet another aspect of the present disclosure, a method for setting a predetermined focus position of a laser beam in a laser machining system is provided. The method comprises providing a first parameter, a second parameter, and a third parameter, wherein the first parameter is a laser-power dependent focus shift A, the second parameter is a time constant τ of a change in the focus position due to a thermal lens, i.e., a temperature-induced change in refractive power, of at least one optical element of a laser beam optics by a factor of 1/e, and the third parameter indicates a current laser power P at time t, calculating a time-dependent value $z_t$ of the focus position based on the first parameter, the second parameter, and the third parameter, and setting the predetermined focus position Z of the laser beam based on the time-dependent value $z_t$ of the focus position.

The method may include and implement the features and properties of the device for determining a focus position of a laser beam in a laser machining system and of the laser machining system according to the embodiments described here.

According to a further aspect, a software (SW) program is described. The software program may be configured to run on a processor, thereby executing the method described in this document.

According to a further aspect, a storage medium is described. The storage medium may comprise a software program configured to run on a processor, thereby executing the method described in this document.

BRIEF DESCRIPTION OF THE DRAWINGS

Embodiments of the disclosure are illustrated in the figures and will be described in more detail below. In the figures.

DETAILED DESCRIPTION OF EMBODIMENTS

Figure 1:
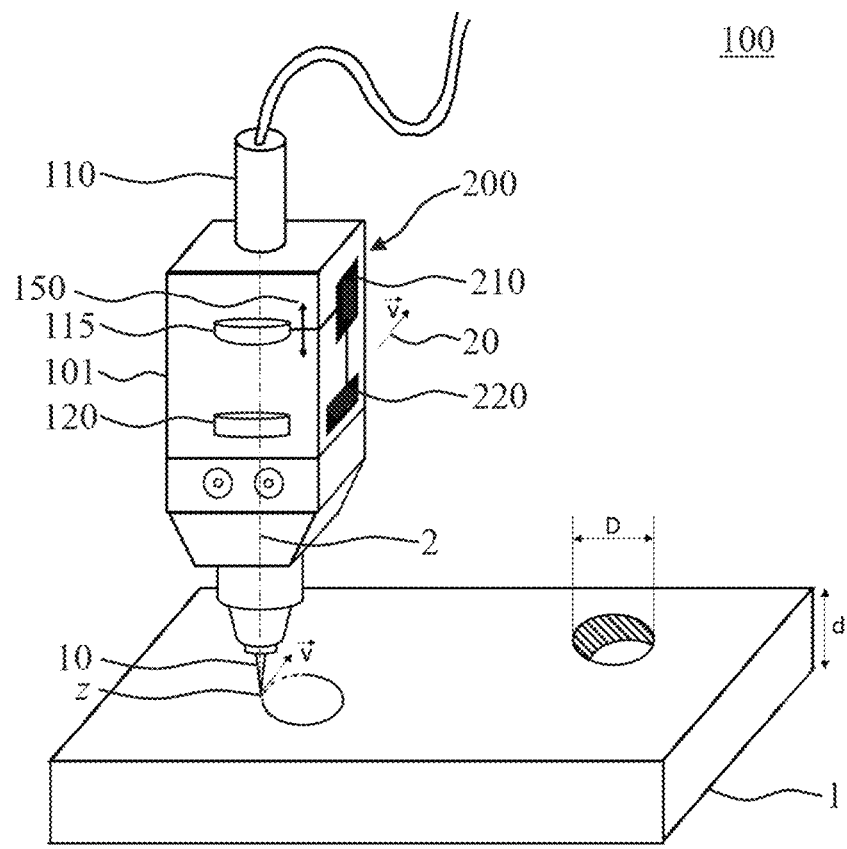
FIG. 1 shows a laser machining system according to embodiments of the present disclosure.

In the following, unless otherwise noted, like reference numerals will be used for like and equivalent elements.

FIG. 1 shows a laser machining system 100 according to embodiments of the present disclosure.

The laser machining system 100 may comprise or be a machining head 101, such as a cutting head or welding head. The laser machining system 100 comprises a laser device 110 for providing a laser beam 10 (also referred to as a "machining beam" or "machining laser beam"). The laser device 110 may comprise or be an optical fiber via which the laser beam 10 is supplied into the machining head 101.

The laser machining system 100 comprises a laser beam optics. In particular, the laser machining system 100 may comprise a collimator optics 115, such as a collimator lens or a zoom system with a plurality of lenses, for collimating the laser beam 10. The laser beam 10 may propagate from the laser device 110 via an optional optical device 140 of the laser beam optics (not shown), which may be a protective glass in front of the collimator optics, a lens or aperture, or combinations thereof, to the collimator optics 115.

Alternatively or additionally, the laser beam optics comprises a focusing optics 120, such as a focus lens or a lens system for focusing the laser beam 10 onto a workpiece 1. The collimator optics 115 and the focusing optics 120 may be integrated into the machining head 101. For example, the machining head 101 may comprise a collimator module integrated into the machining head 101 or mounted on the machining head 101.

The laser machining system 100 or parts thereof, such as the machining head 101, may be movable along a machining direction 20 according to embodiments. The machining direction 20 may be a welding direction and/or a moving direction of the laser machining system 100, such as the machining head 101, with respect to the workpiece 1. In particular, the machining direction 20 may be a horizontal direction. The machining direction 20 may also be referred to as the "feed direction".

The laser machining system 100 or the laser machining head 101 comprises the device 200 for setting a predetermined or desired focus position Z of the laser beam 10 according to the embodiments of the present disclosure. The focus position z can be set in real time with respect to the workpiece 1. The focus position z may indicate the position of the focus of the laser beam 10 focused by the focusing optics 120, for example with respect to the workpiece 1.

The device 200 comprises the computing unit configured to calculate a time-dependent value $z_t$ of the focus position z and a control unit configured the predetermined focus position Z of the laser beam 10 based on the time-dependent value $z_t$ using a movable optical element of the laser beam optics. The computing unit and the control unit may be implemented in a common software and/or hardware module. In the example of FIG. 1, an integrated computing and control unit 210 is shown. Alternatively, the computing unit and the control unit may each be implemented in separate software and/or hardware modules.

The focus position z of the laser beam 10 may be defined or determined essentially parallel to an optical axis 2 of the laser machining system 100. In FIG. 1, the focus position z is shown on a surface of the workpiece 1, by way of example.

According to embodiments, the laser machining system 100 may comprise a setting unit 150 for setting the focus position z. The setting unit 150 may be included in the control unit or connected to the control unit. Based on the focus position z determined by the device 200, the setting unit 150 may set the focus position z. For example, the focus position z may be set in such a way that it corresponds to the specified focus position Z, i.e. a desired focus position, for example in a region of the workpiece 1, such as on a surface or within the workpiece 1. The setting unit 150 for setting the focus position z may include, for example, an actuator displacing at least one movable optical element of the laser beam optics for controlling the focus position, such as the collimator optics 115 and/or the focusing optics 120.

In some embodiments, the device 200 comprises a means 220 for detecting the current laser beam power (e.g. an instantaneous power in CW operation or an average power in short-pulse operation). The device 200 or the laser machining system 100 or the laser machining head may, for example, include a power sensor configured to measure or determine the laser beam power of the laser beam 10. The power sensor may measure or determine the instantaneous or current laser beam power. Alternatively, the device 200 may comprise a data interface via which data relating to the current laser beam power can be received, for example from the laser device 110 or a control of the laser machining system 100 or the laser machining head. The device 200 may use the laser power for determining and/or setting the focus position z, as will be described later.

For optical elements of the laser beam optics, such as protective glasses and/or the collimator optics 115 and/or the focusing optics 120, the phenomenon of the thermally induced refractive power, that is the thermal lens, may occur. The thermal lens may be a dynamic effect. The dynamics are explained in more detail with reference to FIGS. 1 and 2.

FIG. 1 shows a cutting head cutting circles with a diameter D in a metal sheet (e.g., stainless steel) with the thickness d at a feed speed v. For a sheet thickness of d=20 mm, for example, a feed rate of v=2 m/min with a laser power of 15 kW may be used. If the circle diameter is D=50 mm, the cutting head needs about 10 s for each circle. If only one circle is cut in the sheet, the power may be 0 kW shortly before the cut, 15 kW during the cut and 0 kW after the cut. Here, the focus position may also be located inside the sheet, i.e. below the sheet surface.

Figure 2:
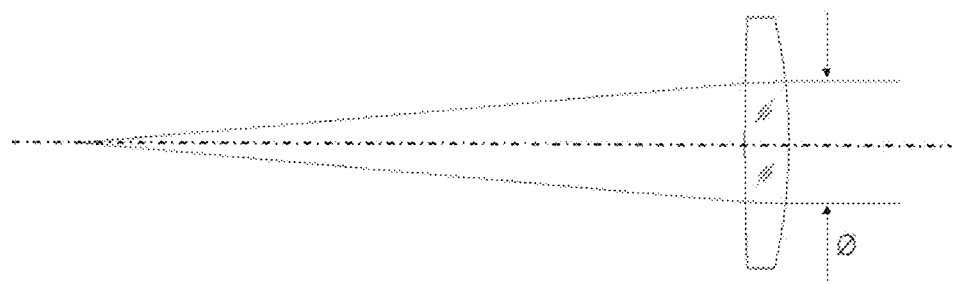
FIG. 2 shows a laser beam and collimator optics of the laser machining system according to embodiments of the present disclosure.

The thermal diffusivity $\kappa$ is a material property used to describe the temporal change in the spatial distribution of temperature due to thermal conduction as a result of a temperature gradient. It measures the rate of heat transfer of a material from the hot side to the cold side. It is related to thermal conductivity, which is used to describe energy transport. For quartz glass, the heat diffusivity is $\kappa=0.007$ cm$^2$/s. FIG. 2 shows a lens (e.g., the collimator lens) of the laser beam optics as well as the laser beam that hits the lens with a beam diameter of about $\bigcirc=10$ mm. In this example the heat diffusion time is approximately $\tau=(\bigcirc/2)^2/\kappa \approx 36$ s.

When comparing the time scales of approximately 10 s and 36 s mentioned with regard to FIGS. 1 and 2, it becomes clear that the circle is cut in a time in which the temperature distribution on the laser beam optics is not stationary. This means that the transient behavior can be essential for cutting quality. This is even more decisive for thinner sheets, smaller geometries and higher laser power.

It is therefore advantageous to compensate for the focus shift dynamically and in real time. There are various ways to achieve this, some of which are explained below in order to emphasize the advantages of the compensation according to the invention using the time-dependent correction term.

For example, a focus position control based on a measurement of a physical property possibly correlating with the thermal lens can be used (without a measurement of the focus position). Although this leads to an improvement in the machining quality with minimal structural effort, it does not allow for high precision in the focus position control and thus high machining quality.

Focus position control including a determination of the focus position may also be used. For this purpose, a fraction of the laser beam may be decoupled and evaluated by a sensor. When a thermal lens occurs, the focus position changes and the sensor may detect a change in the beam diameter. The focus position sensor determines an actual focus position by comparing the beam diameter and the known beam caustics of the laser beam (reference measurement). However, the thermal lens does not only result in a focus shift, but also in a deterioration in the beam quality (imaging errors), leading to a change in the entire beam caustic, e.g. the focus diameter. The determination of the focus position by a comparison with reference values is therefore imprecise, or in other words is not a focus position measurement in real time.

According to the invention, a focus position control takes into account that the thermal lens or a temperature-induced change in refractive power is dynamic. In other words, the calculation of the current or actual focus positions includes a correction term factoring in that the thermal lens is time-dependent. For this purpose, the actual position of the focus, e.g. with respect to the workpiece, is calculated using two parameters, namely the laser-power dependent focus shift A in the laser beam optics and the time constant $\tau$ of a change in the focus position due to the thermal lens in the laser beam optics. Based thereon, the focus position can be set such that the actual focus position corresponds, for example, to a predetermined or desired or target focus position on the workpiece.

A preferred embodiment of the calculation of the current or actual focus positions according to the invention is described in detail below.

With reference to FIG. 1, the focus position z of the machining head 101 is set using a motorized adjustment, for example the collimator optics 115, which may include one or more lenses. The computing and control unit 210 (also referred to as "evaluation unit") uses power data (for example, an instantaneous power in CW operation or an average power in short-pulse operation) and optionally other process parameters, such as the target focus position in order to control the motorized adjustment. The power data are received either through an interface to the laser or the laser system, an integrated sensor, or both. Both the computing and control unit 210 and the power data acquisition may be integrated in the machining head 101. Alternatively, they may be provided externally and connected to the machining head 101 through an interface.

The computing and control unit 210 may comprise a storage medium in which a relationship between a position $L_1$ of the laser beam optics (for example, of the lens shown in FIG. 1 or 4, which may be a collimator optics or a focusing optics) and the focus position z of the laser beam is stored:

$$L_1 = L_1(z) \quad (1)$$

Because the focus position z is dependent on the laser power P and the time t, equation (1) cannot readily be saved as control curves. To allow for precise focus setting in real time, the focus position z may be described as follows:

$$z = z(P, t) = z_0(P_0) + z_t(\Delta P, t) + z_{Offset} \quad (2)$$

Figure 3:
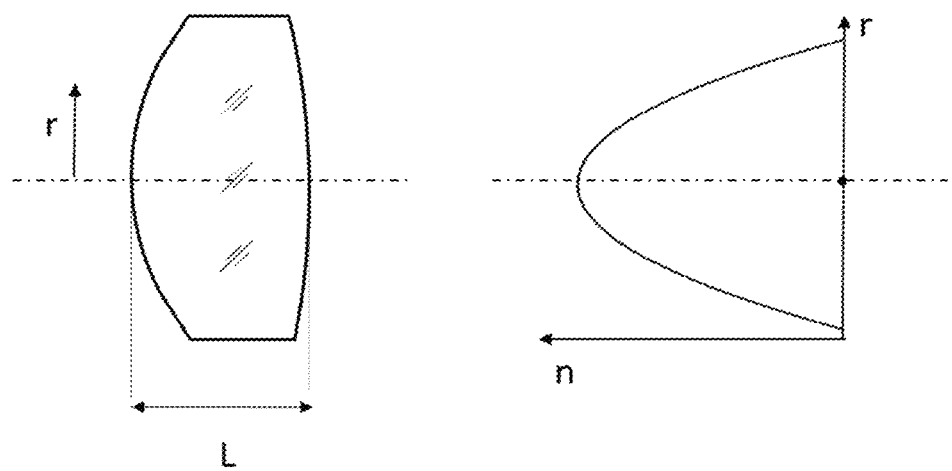
FIG. 3 shows a collimator lens and the refractive index gradient thereof.
Figure 4:
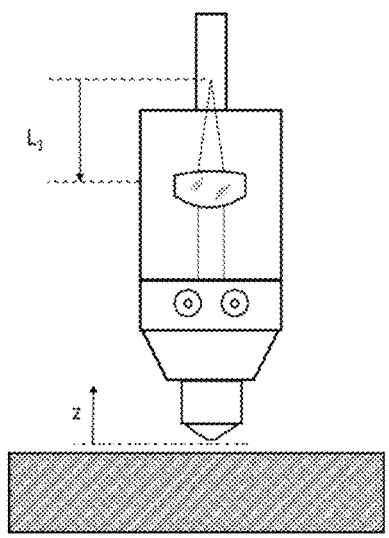
FIG. 4 shows a laser machining system with a coordinate system.
Figure 5:
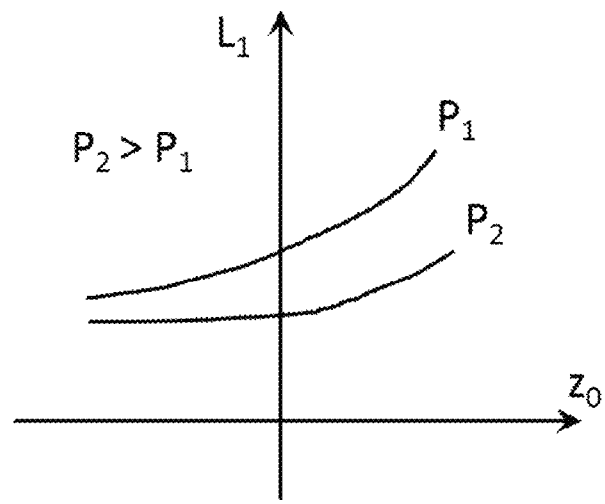
FIG. 5 shows a diagram of the lens position as a function of the stationary component of the focus position and the laser beam power.

The focus position z depends on the laser power P and the time t. In this embodiment, the focus position z may be divided into three components:
1. The first component $z_0(P_0)$ is stationary or independent of time, but may depend on the reference laser power $P_0$. One possible implementation is shown in FIG. 3 to FIG. 5 and is described later.

2. The second component $z_t(\Delta P, t)$ depends on the laser power and the time. $\Delta P$ is defined as $\Delta P=P-P_0$. In other words, $\Delta P$ is defined as the difference between the current power and the reference laser power $P_0$ of the stationary term. Further details are described later.
3. A third component $z_{Offset}$ is an offset value. It serves, e.g., as an adjustment for optomechanical tolerances. This component is independent of time and power.

Stationary Component $z_0(P_0)$

In the simplest case, the stationary component $z_0(P_0)$ describes the position $L_1$ of the laser beam optics without the thermal lens for P=0 kW, i.e. $L_1(P_0=0$ kW). An exemplary description of $L_1$ is shown in FIGS. 4 and 5. The position $L_1$ of the laser beam optics is different for different reference laser powers $P_{01}$ and $P_{02}$. The position $L_1$ can be calculated, for example, using ray tracing software. Here, the thermal lens is modeled, i.e. the refractive index n of the optical component is, as a result of the thermal gradient, also a gradient. There are different approaches to model these gradients. In a first approximation, for example, a parabolic gradient along an axis r perpendicular to the optical axis may be used, as shown in FIG. 3:

$$n(r)=n_0+c_2 \cdot r^2 \qquad (3)$$

with:

$$c_2 = -\frac{a \cdot P}{4\pi \cdot K_T} \cdot \frac{dn}{dT} \cdot \frac{1}{L \cdot L_{Strahl}^2} \qquad (4)$$

$n_0$ is the refractive index of the optical element for r=0, or on the optical axis, $r_{Strahl}$ is the radius of the laser beam (i.e. $\varnothing/2$), L is the thickness of the optical component (i.e. the lens), $K_T$ is the coefficient of thermal conductivity of the lens material, P is the laser power, a is the absorption in the optics component, and dn/dT is the change in the refractive index n as a function of the temperature T.

The equations (3) and (4) serve as the basis for the calculation of $z_0(P_0)$ in equation (2) and describe the refractive index gradient in the steady state (t→∞). In particular, the term $z_0(P_0)$ is the solution to the following question: which distance between the fiber end and the optical element for setting the focus position, e.g. the collimator optics, is necessary to obtain the focus position $z_0$ or the position $L_1(z_0)$ with a reference laser power of $P_0$? The solution to this question is stored as a control curve.

The description of the refractive index may be further refined with other models for the temperature profile. Several options are possible here, e.g. a precise analytical description of the gradient n(r) or numerical methods such as finite element methods.

With reference to FIG. 5, the stationary component $z_0(P_0)$ is described in such a way that the position $L_1$ is calculated exactly as a function of the reference laser power $P_{01}$, $P_{02}$. This is particularly advantageous if the laser beam optics is not a simple lens, but a lens system (e.g. a zoom system), in which there are two or more movable lenses and therefore a plurality of lens positions are necessary in order to achieve a certain focus position and a certain focus diameter. In addition, the number of curves is not limited in FIG. 5. For example, the positions may be calculated for smaller increments of the laser power. Alternatively or additionally, the positions between two curves may be interpolated.

The lens positions $L_1(z_0(P_0))$ may be stored in the computing and control unit. In some embodiments, the positions may be stored not only for a single reference laser power, but for a plurality of reference laser powers: e.g. $L_1(z_{01}(P_{01}))$, $L_1(z_{02}(P_{02}))$, $L_1(z_{03}(P_{03}))$, $L_1(z_{04}(P_{04}))$.

Dynamic Component $z_t(\Delta P, t)$

Figure 6:
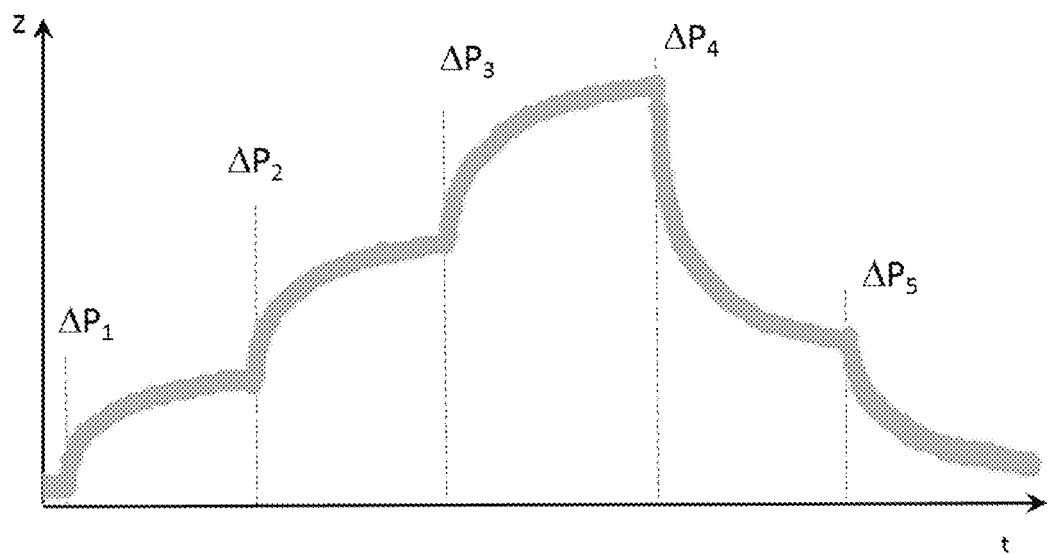
FIG. 6 shows a dynamic behavior of the focus position for different changes in laser beam power.

The second component $z_t(\Delta P, t)$ describes the dynamic behavior of the focus shift, and in particular describes the behavior shown in FIG. 6. FIG. 6 shows an exemplary dynamic behavior of the focus position z with different power changes $\Delta P_1$ to $\Delta P_5$, the predetermined focus position Z remaining unchanged. The object of this component is to compensate for the focus shift caused by the dynamic behavior of the thermal lens so as to keep a given focus position Z constant.

In the example of FIGS. 1 and 2, two time frames are compared: how quickly a circle can be cut and how quickly a thermal gradient arises due to transport of heat from the hot lens center, where the laser radiation is incident, to the cold outside of the lens. As a first approximation, this transient behavior may be described as follows:

$$z_t(\Delta P, t) = A \cdot m^2 \cdot \Delta P \cdot (1 - e^{-t/\tau}) \qquad (5)$$

m is the magnification of the optical system (i.e. the laser beam optics), A is the first parameter indicating the magnitude of the focus shift between two power values in the stationary state per power unit, and τ describes the time scale of the development of the thermal lens. Here, the time t=0 is defined as the time at which a change in power takes place, i.e. when $\Delta P \neq 0$. Subsequently, i.e. t>0, the power is preferably constant, at least for a predetermined time interval.

Equation (5) describes an exponential approximation. For example, in the case of an exponential drop in the focus position (see FIG. 6: $\Delta P_4$ or $\Delta P_5$), the time constant T describes the period of time until the focus position drops by a factor of 1/e. With an imaging scale of 1 and a change in laser power $\Delta P$ of 1 kW, A is the focus shift in the stationary state, i.e. t→∞.

Equation (5) describes a change in focus position for a change in power. By definition, the time t=0 is defined as the time at which a change in power takes place, e.g. when $\Delta P \neq 0$. A filter signal (e.g. a low-pass filter) may be used to approximate the term $P_t = \Delta P \cdot (1 - e^{-t/\tau})$. That is, if the laser power is known, a filter configured to determine a power step $\Delta P_i$ (cf. FIG. 6) in an exponential approximation may be provided. The advantage here is that the time t no longer has to be explicitly taken into account in the above equation (5) because only the change in power is essential. In other words, the filter converts a change in power $\Delta P_i$ (power step or power leap) to another value, e.g. to a filter signal $P_t$ which changes intrinsically over time. Therefore, eventually, the "time-dependent" value of the focus position can be determined only based on the power $P_t$, i.e. as $z_t(P_t)$.

One advantage of the focus setting according to the invention is that the user of the laser machining system (e.g. the end customer) may have three preset parameters (e.g. from the manufacturer) available: $z_{Offset}$, A, and τ. These parameters may primarily be described theoretically, but may show a certain scatter, for example due to the absorption of optical materials or due to different thermal conditions (e.g. water cooling or water flow rate, temperature, etc.). An interface may allow the user to vary these parameters. Effects caused by component replacement, aging or soiling of optics can be compensated for.

Equation (5) also allows for the possibility of describing a zoom system in which a plurality of magnifications m are possible. A and T are independent of the magnification m. $z_{Offset}$ may be defined individually for each magnification, but is independent of time and laser power. In some embodiments, a relationship between the magnification m and the focus position may be stored in the computing and control unit. This means that all complex descriptions may be included in the computing and control unit and the user may optimize the preset parameters by means of a set of simple parameters.

In some embodiments, the description of the transient behavior (i.e. Equation (5)) may be specified more precisely:

$$z_t(\Delta P, t) = \sum_{i=1}^{N} A_i \cdot m^2 \cdot \Delta P \cdot \left(1 - e^{-t/\tau_i}\right) \quad (6)$$

N is a natural number and may be chosen to be suitably large. With this description, different time constants $\tau$ and magnitudes $A_i$ may be used in order to achieve more precise results. Equation (6) is particularly advantageous when different thermal processes having different time scales play a relevant role in the focus shift.

In further embodiments, the description of the transient behavior may be specified more precisely with a polynomial term:

$$z_t(\Delta P, t) = \sum_{i=1}^{N} A_i \cdot m^2 \cdot \Delta P \cdot \left(1 - e^{-t/\tau_i}\right) + \sum_{j=1}^{M} B_j \cdot m^2 \cdot t^j \quad (7)$$

The second term of Equation (7) is a polynomial of the order M. $B_j$ is the coefficient of the power j. Each coefficient ($A_i$, $B_j$) may be independent. M is a natural number.

According to the invention, using two parameters, namely the magnitude A of the laser-power dependent focus shift in the laser beam optics per power unit and a time constant $\tau$ of a change in the focus position due to a thermal lens in the laser beam optics, the actual position of the focus is calculated, e.g. with respect to the workpiece. Based thereon, the actual focus position z may be set such that the actual focus position corresponds to a desired focus position Z, for example.

This allows for simple and robust focus setting in real time. In particular, a time-dependent correction term describing the dynamic development of the focus shift is used for setting the focus position. The time-dependent correction term does not require a complex mechanical structure, allowing for the complexity of the device to be reduced both in terms of manufacture and in terms of operation. In addition, the solution according to the invention makes it possible to react flexibly to the focus shift or fluctuations in the focus. For example, one or more factors can be taken into account, such as scattering due to the absorption of optical materials, different thermal conditions (e.g. water cooling, flow rate and temperature) or spoiling of the laser beam optics.

The invention claimed is:

1. A device for setting a predetermined focus position Z of a laser beam in a laser machining system, comprising:
    a setting unit for setting the focus position z;
    a computing unit configured to calculate a time-dependent value $z_t$ of a focus position z based on a first parameter times a second parameter times a third parameter; and
    a control unit configured to set said predetermined focus position Z of said laser beam by means of said setting unit based on the time-dependent value $z_t$ of the focus position z,
    wherein said first parameter is a laser-power dependent focus shift A,
    wherein said second parameter is a time constant t of a change in focus position due to a temperature-induced change in refractive power of at least one optical element of a laser beam optics by a factor of 1/e, and
    wherein said third parameter is a current laser power P at a point in time t.

2. The device according to claim 1, wherein said computing unit is further configured to calculate the time-dependent value $z_t$ of the focus position z based on a further parameter indicating a magnification m of the laser beam optics.

3. The device according to claim 2, wherein the laser beam optics comprises a zoom system with different settable magnifications $m_i$ and an offset $z_{off,mi}$ can be set for each of the magnifications $m_i$.

4. The device according to claim 2, wherein said computing unit is configured to calculate the time-dependent value $z_t$ of the focus position z using the following equation:

$$z_t(\Delta P, t) = A \cdot m^2 \cdot \Delta P \cdot (1 - e^{-t/\tau})$$

where $\Delta P = P - P_0$, and $P_0$ indicates a reference laser power, and a time t=0 is defined as the time at which a change in the laser power $\Delta P \neq 0$ occurs.

5. The device according to claim 4, wherein said computing unit is configured to exponentially approximate the term $\Delta P \cdot (1 - e^{-t/\tau})$ by means of a filter signal when the laser power P is known and to calculate the time-dependent value z of the focus position z as a function of the laser power with $z_t(\Delta P)$, which is not explicitly dependent on the time t.

6. The device according to claim 4, further comprising a means for detecting the current laser power P, said means comprising one or more power sensors and/or a data interface via which the data relating to the current laser beam power can be received.

7. The device according to claim 1, wherein said control unit is configured to set said predetermined focus position Z of said laser beam based on the time-dependent value $z_t$ and a stationary value $z_0$ of the focus position, the stationary value $z_0$ indicating the focus position z for a reference laser power $P_0$.

8. The device according to claim 7, wherein, in said computing unit or in said control unit, a position $L_1$ for at least one movable optical element of said laser beam optics that is configured to set the focus position Z is stored as a control curve corresponding to the stationary value $z_0$ of the focus position for at least one reference laser power $P_0$.

9. The device according to claim 1, wherein said control unit is configured to set said predetermined focus position Z of said laser beam further based on an offset $z_{off}$.

10. The device according to claim 1, further comprising a user interface configured to receive user input at least for the laser-power dependent focus shift A and/or the time constant t and/or at least one offset $z_{off}$.

11. The device according to claim 1, wherein said setting unit for setting the focus position z is configured to set a position $L_1$ of at least one movable optical element of the laser beam optics configured to set the focus position.

12. The device according to claim 11, wherein said computing unit is configured to calculate a setting for said setting means corresponding to said predetermined focus position Z, said setting comprising a position of the movable optical element corresponding to said predetermined focus position Z.

13. The device according to claim 1, wherein said laser beam optics comprises at least one optical element selected from the group consisting of a collimator optics, a focusing optics, a zoom optics, a beam shaping optics and a protective glass, said at least one optical element having the temperature-dependent refractive power and/or being movable and configured to set the focus position Z.

14. A laser machining system for machining a workpiece by means of a laser beam, comprising:
   a laser beam optics in the beam path of said laser beam, said laser beam optics comprising at least one optical element having a temperature-dependent refractive power; and
   the device according to claim 1.

15. A method for setting a predetermined focus position (Z) of a laser beam in a laser machining system, comprising:
   providing a first parameter, a second parameter, and a third parameter, wherein said first parameter comprises a laser-power dependent focus shift A, said second parameter comprises a time constant t of a change in the focus position due to a temperature-induced change in refractive power of at least one optical element of a laser beam optics by a factor of 1/e, and wherein said third parameter comprises a current laser power P at a time t;
   calculating a time-dependent value $z_t$ of the focus position (z) based on said first parameter, said second parameter, and said third parameter according to an equation $Z_t(\Delta P,t)=A \cdot m^2 \cdot \Delta P \cdot (1-e^{-t/\tau})$, wherein $\Delta P=P-P_0$, and $P_0$ indicates a reference laser power, and a time t=0 is defined as the time at which a change in the laser power $\Delta P \neq 0$ occurs; and
   setting said predetermined focus position (Z) of said laser beam based on the time dependent value $z_t$.

\* \* \* \* \*